(12) United States Patent
Ma et al.

(10) Patent No.: US 12,247,957 B1
(45) Date of Patent: Mar. 11, 2025

(54) PIN-ON-DISK TYPE IN-SITU CURRENT-CARRYING FRICTION TESTING SYSTEM

(71) Applicant: Jilin University, Changchun (CN)

(72) Inventors: Zhichao Ma, Changchun (CN); Chaofan Li, Changchun (CN); Jiakai Li, Changchun (CN); Zheng Yang, Changchun (CN); Wei Zhang, Changchun (CN); Hongcai Xie, Changchun (CN); Yicheng Li, Changchun (CN); Shuai Tong, Changchun (CN); Junming Xiong, Changchun (CN); Zixin Guo, Changchun (CN); Guoxiang Shen, Changchun (CN); Hongwei Zhao, Changchun (CN); Luquan Ren, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 18/949,900

(22) Filed: Nov. 15, 2024

(30) Foreign Application Priority Data

Sep. 14, 2024 (CN) .......................... 202411290729.7

(51) Int. Cl.
*G01N 3/56* (2006.01)
(52) U.S. Cl.
CPC ..................................... *G01N 3/56* (2013.01)
(58) Field of Classification Search
CPC ....................................................... G01N 3/56
USPC ............................................................. 73/9
See application file for complete search history.

(56) References Cited

U.S. PATENT DOCUMENTS

2018/0024035 A1\* 1/2018 Khosla ..................... G01N 3/46
356/35.5

FOREIGN PATENT DOCUMENTS

| CN | 107132183 B |   | 9/2017 |              |
|----|-------------|---|--------|--------------|
| CN | 107063908 B | * | 9/2019 | ... G01N 3/56 |
| CN | 211505074 U |   | 9/2020 |              |
| CN | 115629004 A |   | 1/2023 |              |

(Continued)

OTHER PUBLICATIONS

Mo et al. Machine translation of CN 107063908 B. Published Sep. 2019. Translated Jan. 2025. (Year: 2019).*

*Primary Examiner* — Walter L Lindsay, Jr.
*Assistant Examiner* — Philip T Fadul
(74) *Attorney, Agent, or Firm* — Birchwood IP

(57) ABSTRACT

The present invention discloses a pin-on-disk type in-situ current-carrying friction testing system, and belongs to the technical field of friction performance testing. The friction testing system includes a pin-on-disk type friction pair, a current loading mechanism, and a magnetic field generating mechanism. The current loading mechanism includes a conductive terminal abutting against an annular sidewall of a disk specimen and used to guide a current in the disk specimen to flow along a horizontal direction, and the magnetic field generating mechanism is used to generate a magnetic field. When a pin specimen and a disk specimen rotate relatively, the pin specimen, the conductive terminal, and the magnetic field generating mechanism are relatively stationary, and an Ampere force generated by the current in the disk specimen flowing in the horizontal direction under the action of the magnetic field faces a support platform.

6 Claims, 18 Drawing Sheets

(56) References Cited

FOREIGN PATENT DOCUMENTS

CN 116879002 A 10/2023
KR 20070067862 A 6/2007

* cited by examiner

PIN-ON-DISK TYPE IN-SITU CURRENT-CARRYING FRICTION TESTING SYSTEM

CROSS-REFERENCE TO RELATED APPLICATIONS

This application claims priority to Chinese Patent Application No. 202411290729.7, filed on Sep. 14, 2024, which is hereby incorporated by reference in its entirety.

TECHNICAL FIELD

The present invention relates to the technical field of friction performance testing, specifically to a pin-on-disk type in-situ current-carrying friction testing system used to test current-carrying friction performance of an object.

BACKGROUND

Current-carrying friction refers to a frictional behavior in which the current passes through a friction pair while the friction of the friction pair is generated. The complexity of a friction phenomenon is increased due to the introduction of the current, which involves the coupling of multiple factors and multiple variables. At present, the coupling mechanism between variables is unclear, and the mechanism of material failure is unclear. Therefore, it is necessary to use a current-carrying friction tester for in-depth research.

A pin-on-disk type current-carrying friction tester is standard friction testing equipment, a friction pair of which consists of a pin specimen and a disk specimen. During testing, the pin specimen slides relative to the disk specimen, which requires the disk specimen to be fixed. At present, a clamping device is usually adopted for fixing, as shown in FIG. 1, the clamping device includes a lantern ring and a jackscrew positioned at a side wall of the lantern ring. During use, the disk specimen is placed into the lantern ring, and the jackscrew is rotated to enable the disk specimen to abut against a side wall of the disk specimen, which requires that the disk specimen has a strong pressure-bearing capacity, such as sufficient thickness, otherwise, the disk specimen is easy to deform. Moreover, during the current-carrying friction process, the disk specimen is easily loosened after being deformed by heat, which affects the use. Especially for a thin-walled disk, a plane of the disk specimen abutting against the pin specimen is not horizontal any more after the disk specimen is deformed, consequently, the pin specimen continuously moves up and down when sliding along the disk specimen, even serious vibration occurs, and the determination of experimental data is affected.

SUMMARY

To solve the above problems, the present invention provides a pin-on-disk type in-situ current-carrying friction testing system, which is provided with a support platform for carrying a disk specimen, a conductive terminal arranged along an annular sidewall of the disk specimen for guiding a current in the disk specimen to flow in a horizontal direction, and a magnetic field configured to enable an Ampere force generated when the current of the disk specimen passes through the magnetic field to push the disk specimen to press the support platform, thereby achieving fixing the disk specimen on the support platform.

The specific solution of the present invention is as follows:

A pin-on-disk type in-situ current-carrying friction testing system includes:
a pin-on-disk type friction pair, including a disk specimen arranged horizontally and a pin specimen arranged vertically;
a clamping mechanism used to clamp the pin specimen;
an axial force loading mechanism used to push the pin specimen to move vertically;
a rotating power mechanism used to drive the disk specimen and the pin specimen to rotate relatively;
a force measuring mechanism used to measure a force between the disk specimen and the pin specimen;
a support platform used to support the disk specimen;
a current loading mechanism used to load a current to a contact surface between the disk specimen and the pin specimen, including a conductive terminal abutting against an annular sidewall of the disk specimen to guide a current in the disk specimen to move along a horizontal direction; and
a magnetic field generating unit used to generate a magnetic field;
wherein when the pin specimen and the disk specimen rotate relatively, the pin specimen, the conductive terminal, and the magnetic field are relatively stationary, and the current in the disk specimen flowing along the horizontal direction generates an Ampere force facing the support platform under the action of the magnetic field, so that the disk specimen is tightly pressed on the support platform, a dynamic friction force between the pin specimen and the disk specimen is increased, and the purpose of fixing the disk specimen on the support platform is achieved.

In a specific embodiment of the present invention, the friction testing system further includes a centering mechanism used to enable a center line of the disk specimen to be coaxially arranged with a rotating shaft of the support platform.

Further, the centering mechanism includes:
a support platform, wherein the rotating shaft is fixedly connected to the support platform and extends along a center line of the support platform, and a plurality of first guide rails penetrating through the support platform are arranged on the support platform in a circular array around the rotating shaft;
a rotating disk annularly and coaxially sleeved on an outer wall of the rotating shaft, wherein a plurality of second guide rails penetrating through the rotating disk are arranged on the rotating disk in a circular array around the rotating shaft; and
a plurality of pin members, wherein each pin member includes a rod and two heads at two ends of the rod;
wherein each pin member corresponds to one first guide rail and one second guide rail, the rod of each pin member passes through the first guide rail and the second guide rail, and the two heads of each pin member are positioned at two sides of the first guide rail and the second guide rail; and when the support platform and the rotating disk rotate relatively, the first guide rail guides the pin member to move along a first direction, the second guide rail guides the pin member to move along a second direction, the first direction and the second direction are positioned in a same plane, and an included angle between the first direction and the second direction is an acute angle or an obtuse angle.

In a specific embodiment of the present invention, the rotating shaft includes:

a cross-shaped hinge shaft formed by fixedly connecting a first hinge shaft and a second hinge shaft which are vertical to each other;

a first shaft section fixedly connected to the support platform and extending along a center line of the support platform, wherein the first shaft section is hinged to the first hinge shaft;

a second shaft section hinged to the second hinge shaft, wherein an annular boss is arranged on an annular sidewall of the second shaft section; and a plurality of push rods arranged along a circumference of the annular boss and used to adjust an inclination angle of the support platform, wherein each push rod passes through the annular boss and is threadedly connected to the annular boss, and center lines of all push rods are parallel to a center line of the second shaft section.

In a specific embodiment of the present invention, the friction testing system further includes a levelness calibration mechanism used to calibrate a levelness of an end face of the disk specimen far away from the rotating shaft, wherein the levelness calibration mechanism includes:

a cylinder body;

an annular cylinder, wherein the annular cylinder is carried in the cylinder body by a support frame, a center line of the annular cylinder is parallel to a center line of the cylinder body, and the second shaft section can be inserted into the annular cylinder and is in clearance fit with the annular cylinder; and a horizontal plate fixedly connected to the cylinder body in a detachable manner, wherein a center line of the annular cylinder is perpendicular to an end face of the annular cylinder facing the annular cylinder, and the horizontal plate can move along a center line of the annular cylinder.

In a specific embodiment of the present invention, the friction testing system further includes an in-situ testing device, wherein the in-situ testing device includes a high-speed camera, a thermal infrared imager, and an acoustic emission sensor, the high-speed camera is used to capture transient phenomena of electric arcs during testing of a pin-on-disk type friction pair, the thermal infrared imager is used to collect temperature information during testing of a pin-on-disk type friction pair, and the acoustic emission sensor is used to collect acoustic signals during testing of a pin-on-disk type friction pair.

Compared with the prior art, the present invention has the following advantages.

The present invention utilizes an Ampere force of a current carried by friction through a magnetic field to push a disk specimen to press a support platform, thereby fixing the disk specimen on the support platform without using fasteners, which is simple in operation, and there is no need to locally squeeze the disk specimen, which will not cause large deformation. The present invention changes a force direction when the disk specimen is fixed, and fixing the disk specimen with a support disk will not cause deformation of a top plane of the disk specimen, which is beneficial to improving the test accuracy. The present invention is suitable for testing disk specimens with different thicknesses, and can especially fasten a sheet specimen, which is beneficial for saving the materials of the disk specimen and reducing experimental costs.

Figure 1:
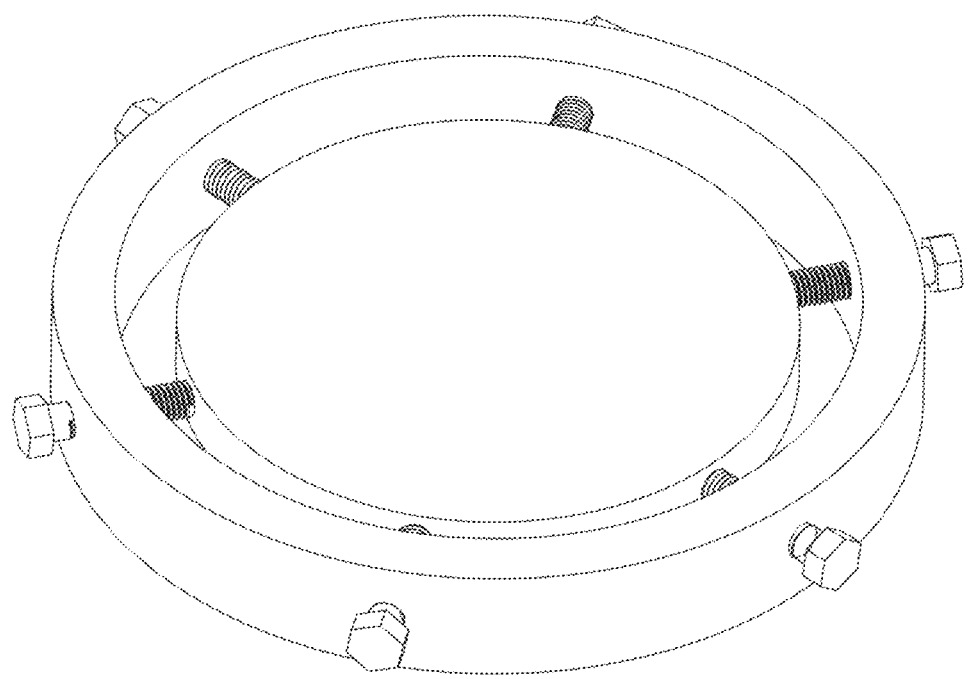
FIG. 1 is a schematic diagram of a structure of a disk specimen fixing device of a pin-on-disk type in-situ current-carrying friction testing system in the prior art.

In the drawings, 1000: pin-on-disk type friction pair; 1010: acoustic emission sensor; 1020: high-speed camera; 1030: thermal infrared imager; 1040: base; 1050: L-shaped cantilever beam; 1051: column; 1052: horizontal beam; 1100: disk specimen; 1200: pin specimen; 2000: clamping mechanism; 3000: axial force loading mechanism; 4000: rotating power mechanism; 5000: current loading mechanism; 5100: conductive terminal; 5200: resistor; 5300: power supply; 5400: ammeter; 5500: current; 5600: Ampere force; 6000: force measuring mechanism; 7000: centering mechanism; 7100: support platform; 7110: rotating shaft; 7111: first shaft section; 7113: cross-shaped hinge shaft; 71131: first hinge shaft; 71132: second hinge shaft; 7114: push rod; 7120: first guide rail; 7112: second shaft section; 71121: annular boss; 7200: rotating disk; 7210: second guide rail; 7300: pin member; 7310: rod; 7320: head; 8000: magnetic field generating mechanism; 9000: levelness calibration mechanism; 9100: cylinder; 9200: annular cylinder; 9300: support frame; and 9400: horizontal plate.

DESCRIPTION OF EMBODIMENTS

The present invention is further described in detail below with reference to the embodiments and drawings; however, the embodiments of the present invention are not limited thereto.

Embodiment

Referring to FIGS. 2 to 18, a plurality of specific embodiments of a pin-on-disk type in-situ current-carrying friction testing system of the present invention are shown. The pin-on-disk type in-situ current-carrying friction testing system of the present invention includes a pin-on-disk type friction pair 1000, a clamping mechanism 2000, an axial force loading mechanism 3000, a rotating power mechanism 4000, a current loading mechanism 5000, a force measuring mechanism 6000, a support platform 7100, a conductive terminal 5100, and a magnetic field generating mechanism 8000. The pin-on-disk type friction pair 1000 includes a disk specimen 1100 and a pin specimen 1200, the disk specimen 1100 is horizontally arranged on the support platform 7100, the clamping mechanism 2000 is used to clamp the pin specimen 1200, the pin specimen 1200 is vertically arranged after being clamped, and a center line of the pin specimen 1200 is perpendicular to an end face of the pin specimen 1100 facing the pin specimen 1200 (an upper end face of the disk specimen 1100 in FIG. 2). The axial force loading mechanism 3000 is used to push the pin specimen 1200 to move along an axial direction of the disk specimen 1100, so as to control a pressure between the pin specimen 1200 and the disk specimen 1100; the rotating power mechanism 4000 is used to control a relative rotary motion between the pin specimen 1200 and the disk specimen 1100, so that dynamic friction is formed; the force measuring mechanism 6000 is used to measure a force between the pin specimen 1200 and the disk specimen 1100; the current loading mechanism 5000 is used to load a current, after the current is loaded, the current flows through a contact surface between the pin specimen 1200 and the disk specimen 1100, the current loading mechanism 5000 includes a conductive terminal 5100, one end of the conductive terminal 5100 abuts against an annular sidewall of the disk specimen 1100 and is used to guide a current in the disk specimen 1100 to flow in a horizontal direction; the magnetic field generating mechanism 8000 is used to generate a magnetic field, and when the pin specimen 1200 and the disk specimen 1100 rotate relatively, the pin specimen 1200, the conductive terminal 5100, and the magnetic field generating mechanism 8000 are relatively stationary, and an Ampere force 5600 generated by a current 5500 flowing in a horizontal direction in the disk specimen 1100 under the action of the magnetic field faces the support platform 7100, so that the disk specimen 1100 is tightly pressed on the support platform 7100, and the purpose of fixing the disk specimen 1100 on the support platform 7100 is achieved.

The present invention is suitable for all conductive pin-on-disk type friction pairs 1000. A force generated by a current in a magnetic field is utilized for clamping, which is simple to operate and will not damage the friction pairs. Especially for a sheet disk specimen 1100, no radial clamping force is required, a contact area between the disk specimen 1100 and a support platform 7100 is large, and the force distribution is more uniform, which will not cause serious deformation of the disk specimen 1100, so that the current-carrying friction performance of the disk specimen can be accurately measured.

Figure 2:
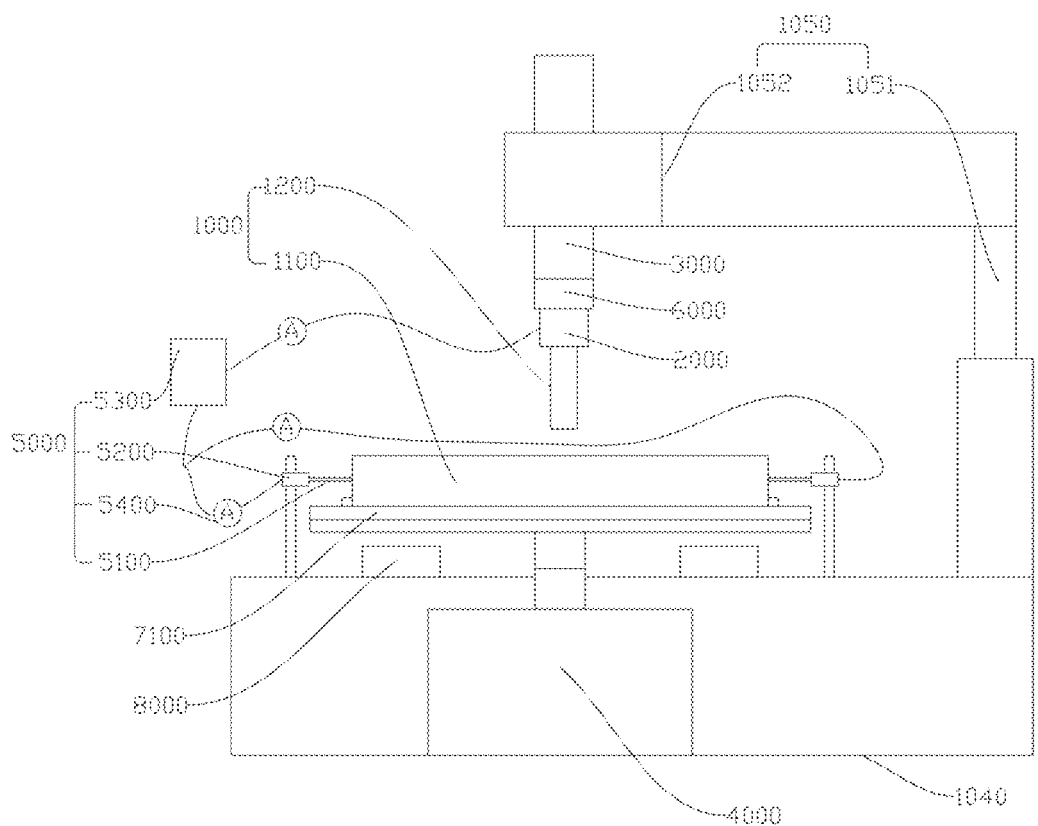
FIG. 2 is a schematic diagram of a three-dimensional structure of a specific embodiment of a pin-on-disk type in-situ current-carrying friction testing system according to the present invention.
Figure 3:
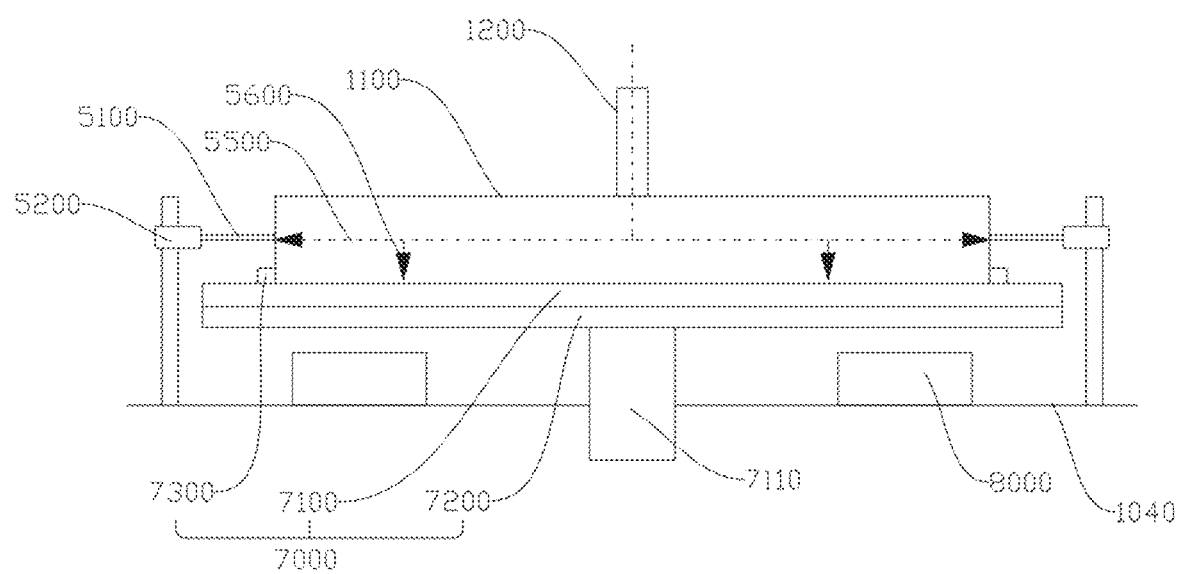
FIG. 3 is an assembly diagram of components around a disk specimen in FIG. 2.
Figure 4:
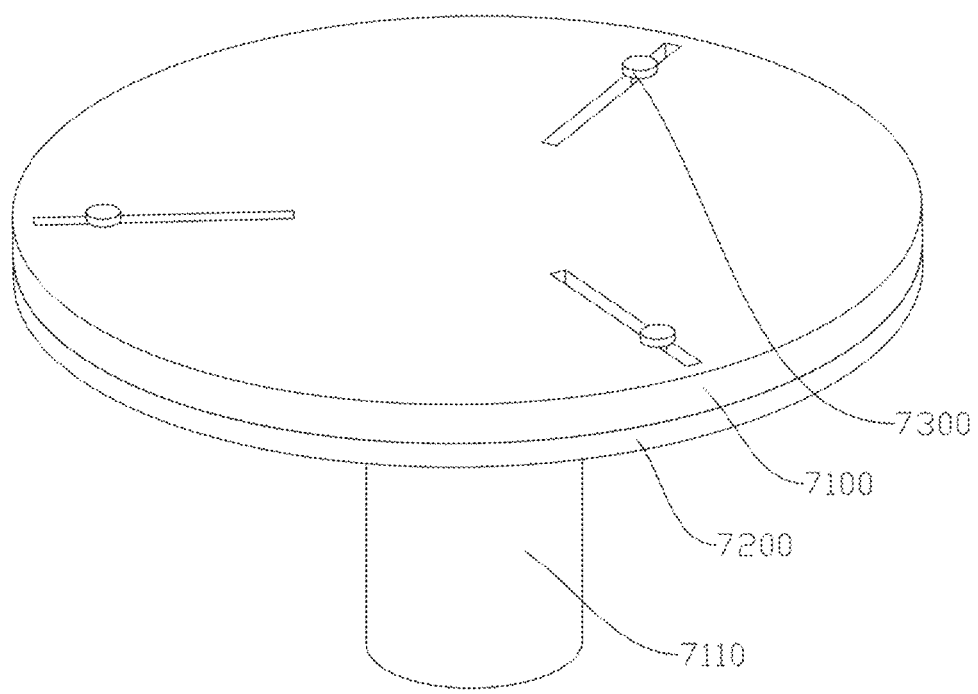
FIG. 4 is a schematic diagram of an overall structure of a centering mechanism in FIG. 3.
Figure 5:
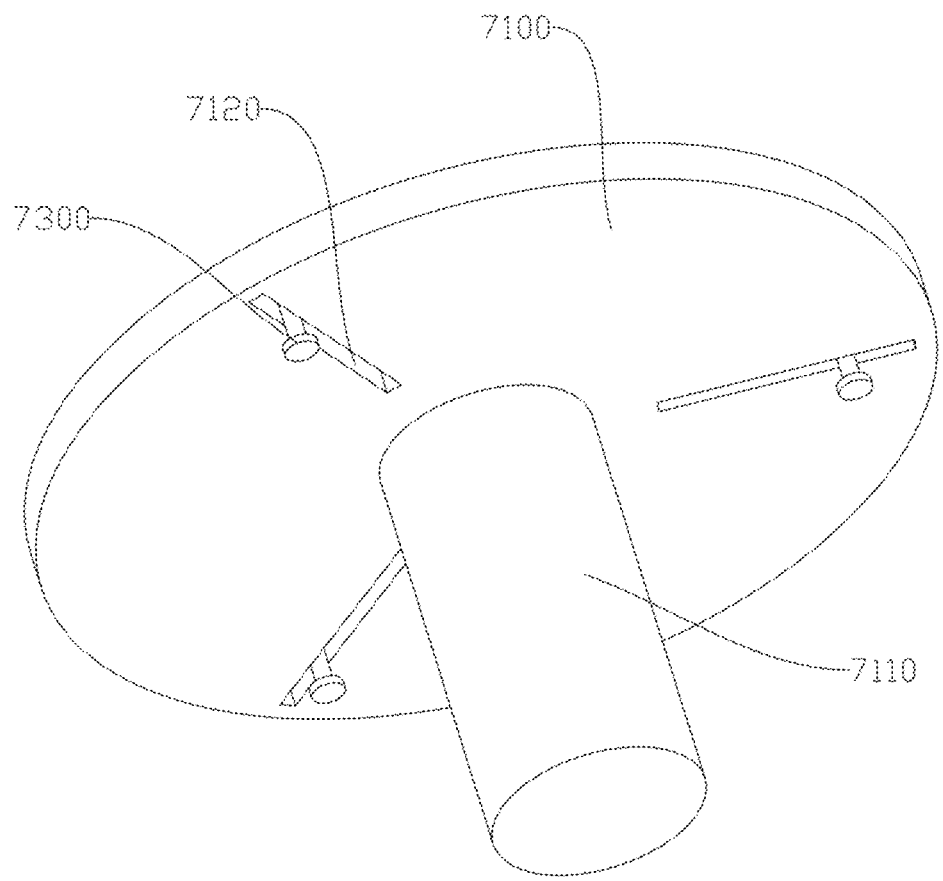
FIG. 5 is an assembly diagram of a rod and a support platform in FIG. 4.
Figure 6:
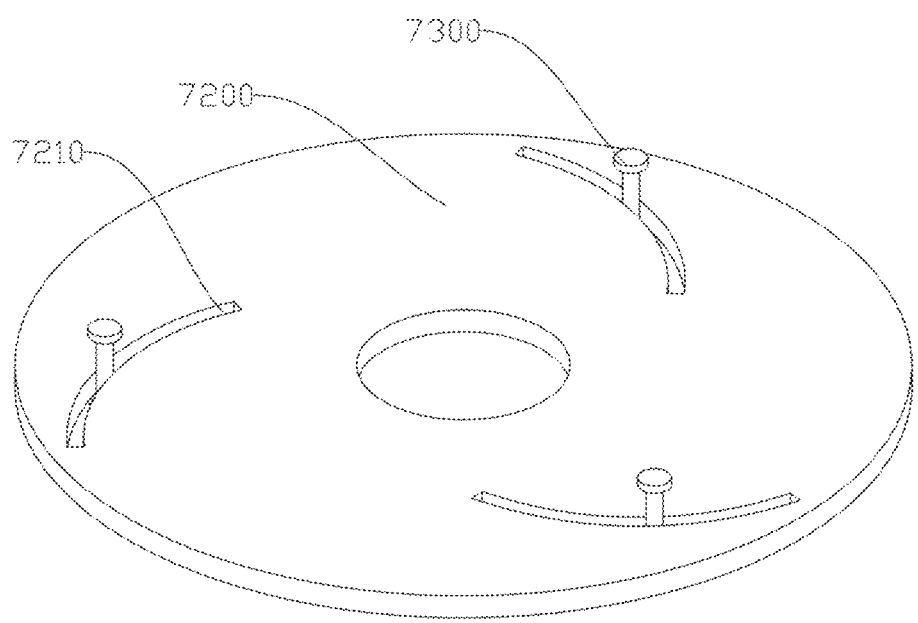
FIG. 6 is an assembly diagram of a rod and a rotating disk in FIG. 4.
Figure 7:
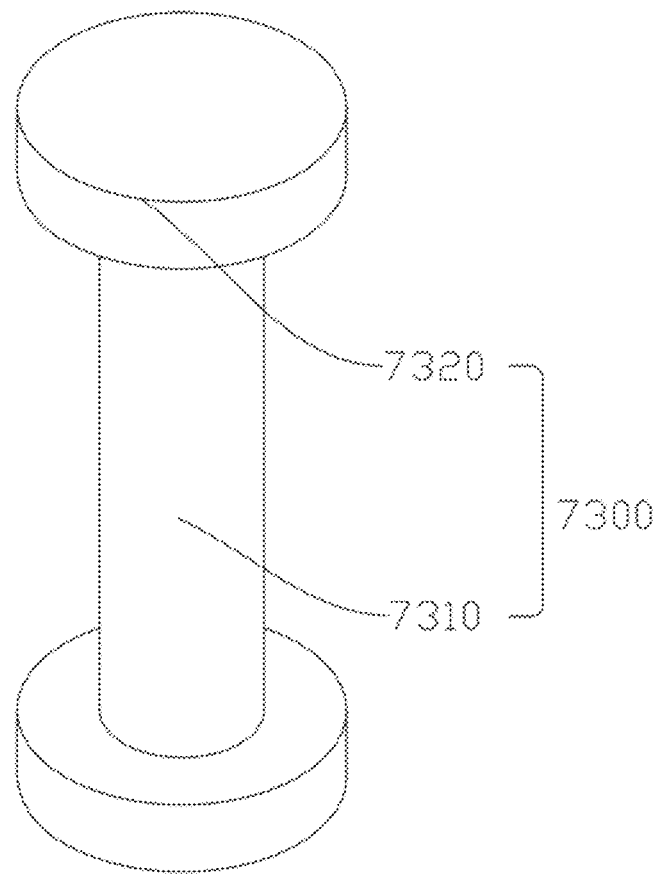
FIG. 7 is a schematic diagram of a structure of a rod in FIG. 4.

In the present invention, the pin specimen 1200 and the disk specimen 1100 rotate relatively to form dynamic friction. In some embodiments, the disk specimen 1100 may be kept stationary, and the pin specimen 1200 may be driven to rotate by the rotating power mechanism 4000. In other embodiments, as shown in FIG. 2, the pin specimen 1200 may be kept stationary, and the disk specimen 1100 may be driven to rotate by the rotating power mechanism 4000.

In the present invention, the force measuring mechanism 6000 may be configured based on a requirement. As shown in FIG. 2, a two-dimensional force sensor capable of measuring a normal force and a lateral force between the disk specimen 1100 and the pin specimen 1200 is selected.

In the present invention, there are many specific options for the magnetic field generating mechanism 8000. For example, a magnetic field may be generated by a current, or other methods in the prior art can be used to generate a magnetic field. The specific magnetic field intensity and direction may be selected based on a requirement, and the magnetic field generating mechanism 8000 with an adjustable magnetic field intensity is preferred to adjust a pressure of the disk specimen 1100 on the support platform 7100 to prevent the disk specimen 1100 from sliding relative to the support platform 7100.

In the present invention, when the disk specimen 1100 is driven to rotate by the rotating power mechanism 4000, if a center of the disk specimen 1100 is not concentric with a rotating shaft of the rotating power mechanism 4000, the disk specimen 1100 is in an eccentric rotation state, which increases a static friction force between the disk specimen 1100 and the support platform 7100 and is not beneficial to the fixation of the disk specimen 1100, and the disk specimen is likely to fall off particularly when rotating at a high speed. Therefore, in some embodiments, a centering mechanism 7000 is further provided for coaxially arranging a center line of the disk specimen 1100 and a rotating shaft 7110 of the support platform 7100, that is, a center line of the disk specimen 1100 is coincident with a center line of the rotating shaft 7110. There are many specific centering mechanisms 7000. As shown in FIGS. 3 to 7, the centering mechanism 7000 includes a support platform 7100, a rotating disk 7200, and a plurality of pin members 7300. A rotating shaft 7110 extending along a center line of the support platform 7100 is provided in a middle of the support platform. A plurality of first guide rails 7120 penetrating through the support platform 7100 are arranged on the support platform 7100 in a circular array around the rotating shaft 7110, the rotating disk 7200 is annular with a hollow center, the rotating disk 7200 is coaxially sleeved on an outer wall of the rotating shaft 7110, a plurality of the second guide rails 7210 penetrating through the rotating disk 7200 are arranged on the rotating disk 7200 in a circular array around the rotating shaft 7110, the pin members 7300, the first guide rails 7120 and the second guide rails 7210 correspond to each other one by one, that is, each pin member 7300 corresponds to one first guide rail 7120 and one second guide rails 7210, and the first guide rail 7120 and the second guide rail 7210 are tapered notches, that is, a distance between a wall surface of a notch of a guide rail and a center line of the rotating shaft 7110 increases or decreases progressively from one end of the guide rail to the other end of the guide rail. The pin member 7300 includes a rod 7310 and two heads 7320 at two ends of the rod 7310, the rod 7310 of each pin member 7300 is inserted into a corresponding first guide rail 7120 and second guide rail 7210, the two heads 7320 at two ends of the rod 7310 are positioned at two sides of the support platform 7100 and the rotating disk 7200, and a size of the head 7320 is greater than a width of the notches of the first guide rail 7120 and the second guide rail 7210. When the support platform 7100 and the rotating disk 7200 rotate relatively, the first guide rail 7120 guides the pin member 7300 to move in a first direction, the second guide rail 7210 guides the pin member 7300 to move in a second direction, the first direction and the second direction are both in a same plane, and an included angle between the first direction and the second direction is an acute angle or an obtuse angle, that is, the first direction and the second direction are neither parallel nor perpendicular. Therefore, when the rotating disk 7200 is rotated, all pin members 7300 move synchronously along the first guide rail 7120 of the support platform 7100, so that the center line of the disk specimen 1100 is coincident with the center line of the rotating shaft 7110.

In some embodiments, to increase a friction force between the disk specimen 1100 and the support platform 7100, a contact surface between the support platform 7100 and the disk specimen 1100 may be roughened, for example, one side of the support platform 7100 facing the disk specimen 1100 is a rough surface.

Figure 8:
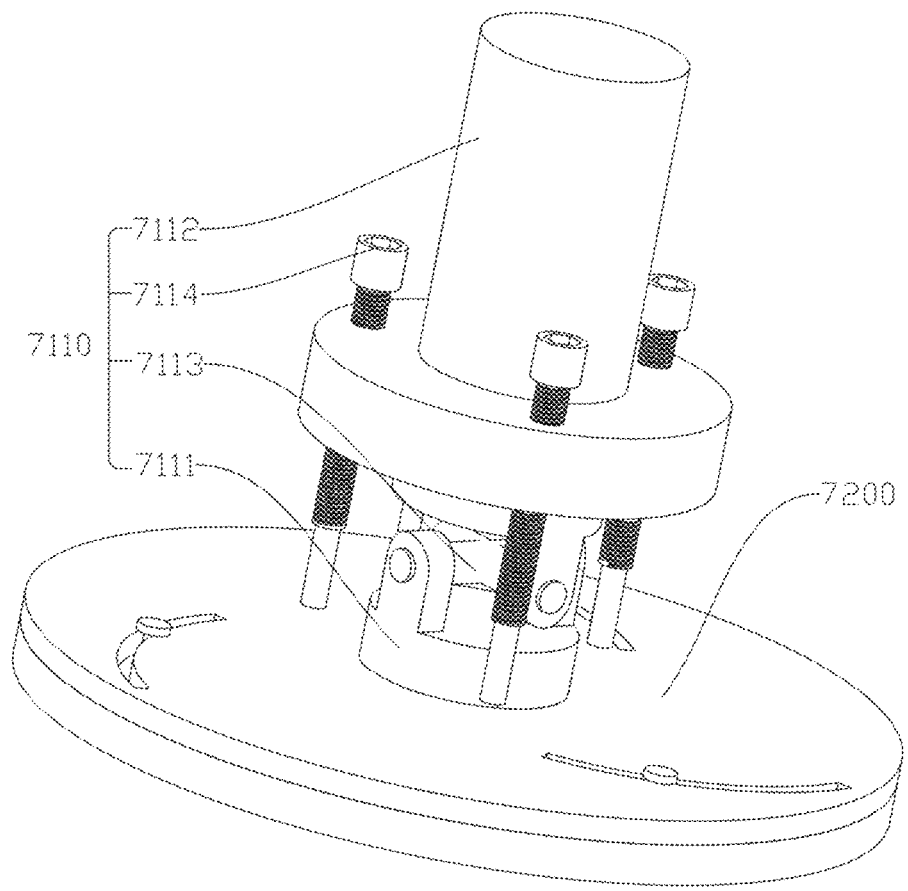
FIG. 8 is a schematic diagram of an overall structure of a centering mechanism in another embodiment.
Figure 9:
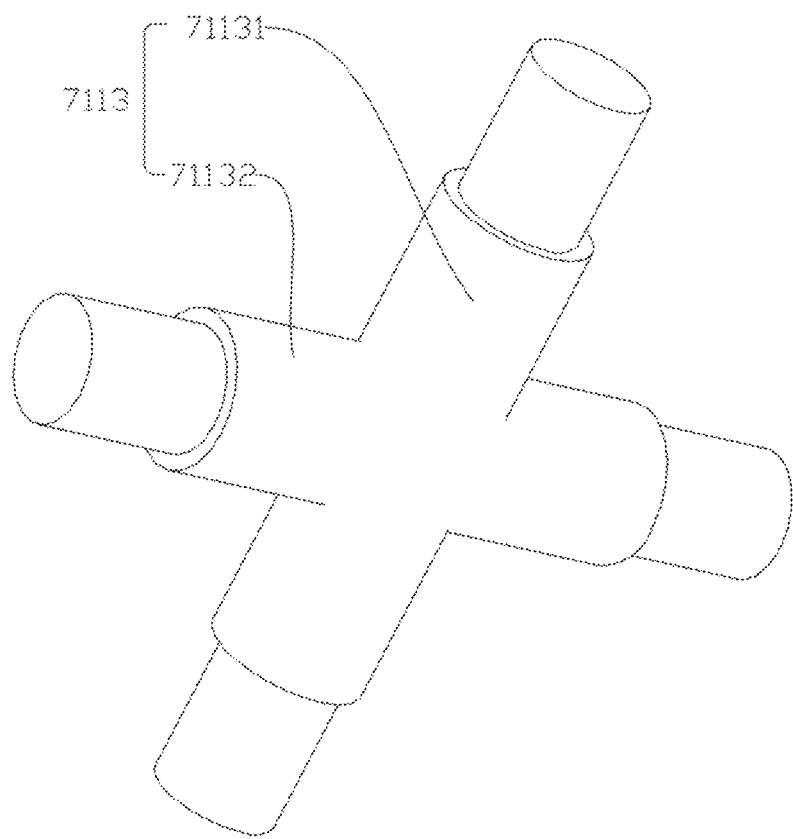
FIG. 9 is a schematic diagram of a structure of a cross-shaped hinge shaft in FIG. 8.
Figure 10:
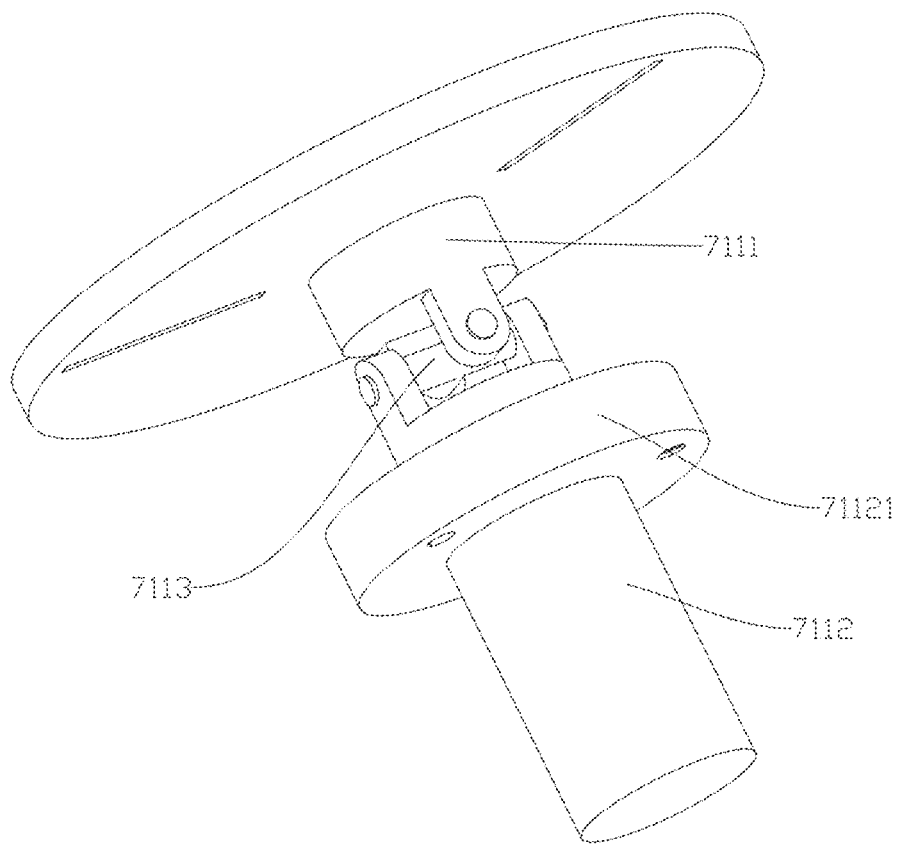
FIG. 10 is an assembly diagram of a rotating shaft and a support platform in FIG. 8.
Figure 11:
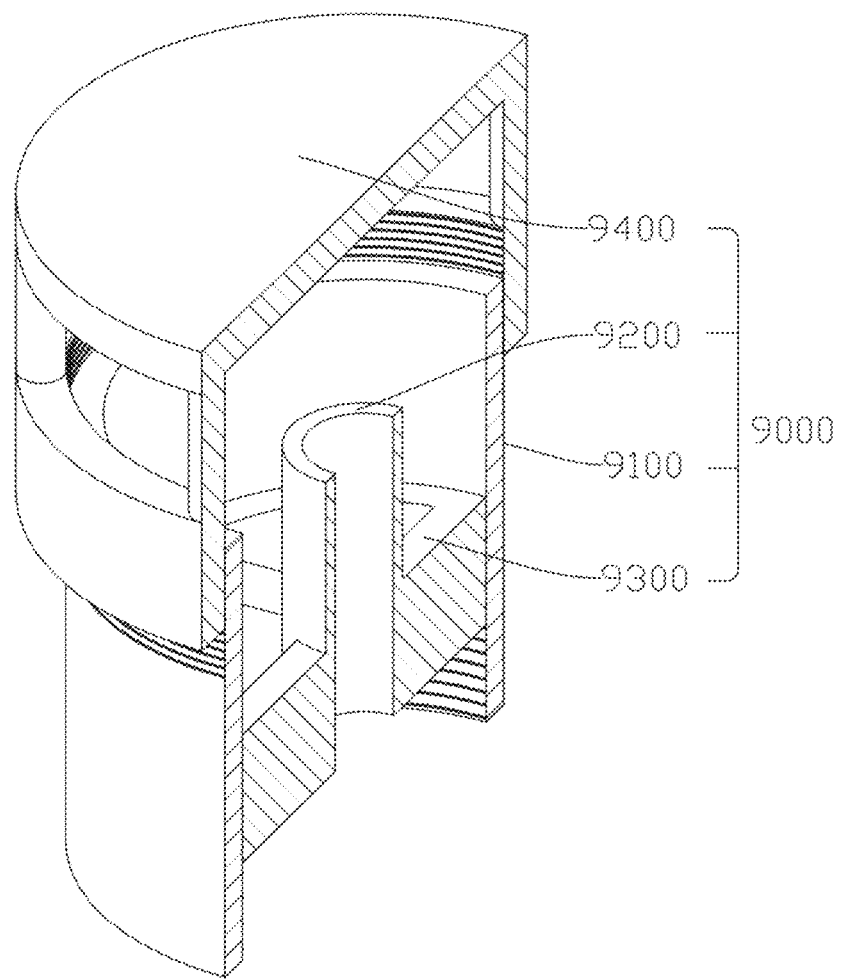
FIG. 11 is a three-dimensional cross-sectional view of a levelness calibration mechanism matched with the centering mechanism in FIG. 8.
Figure 12:
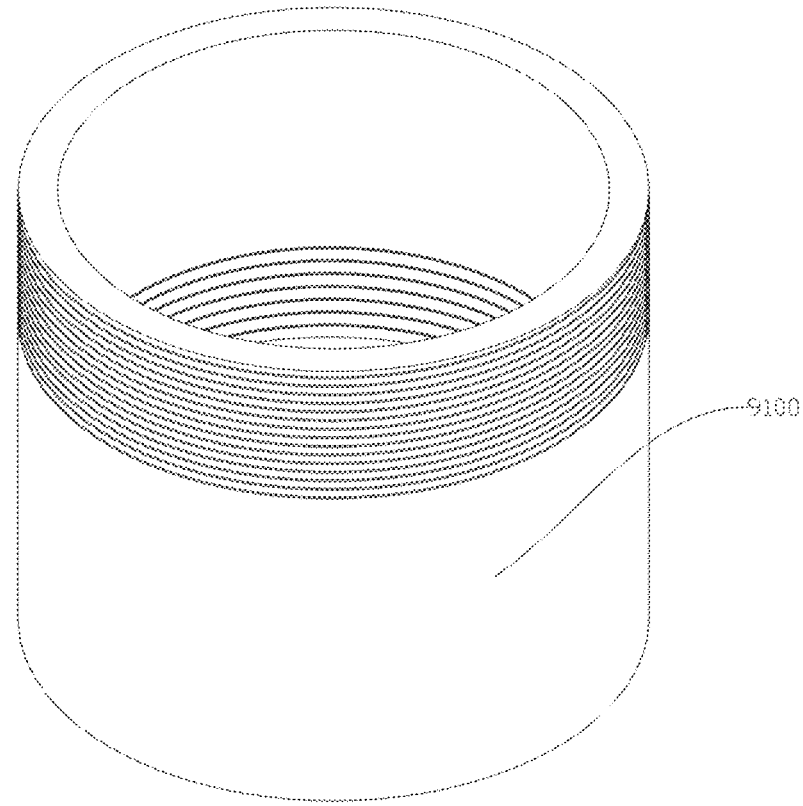
FIG. 12 is a schematic diagram of a structure of a cylinder body in FIG. 11.
Figure 13:
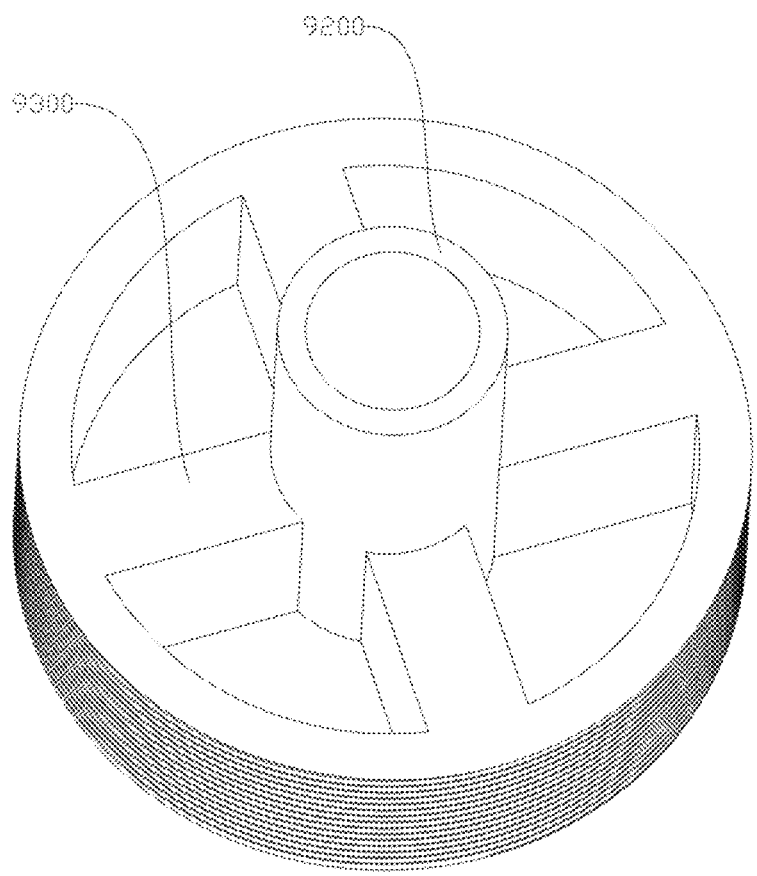
FIG. 13 is an assembly diagram of an annular cylinder and a support frame in FIG. 11.
Figure 14:
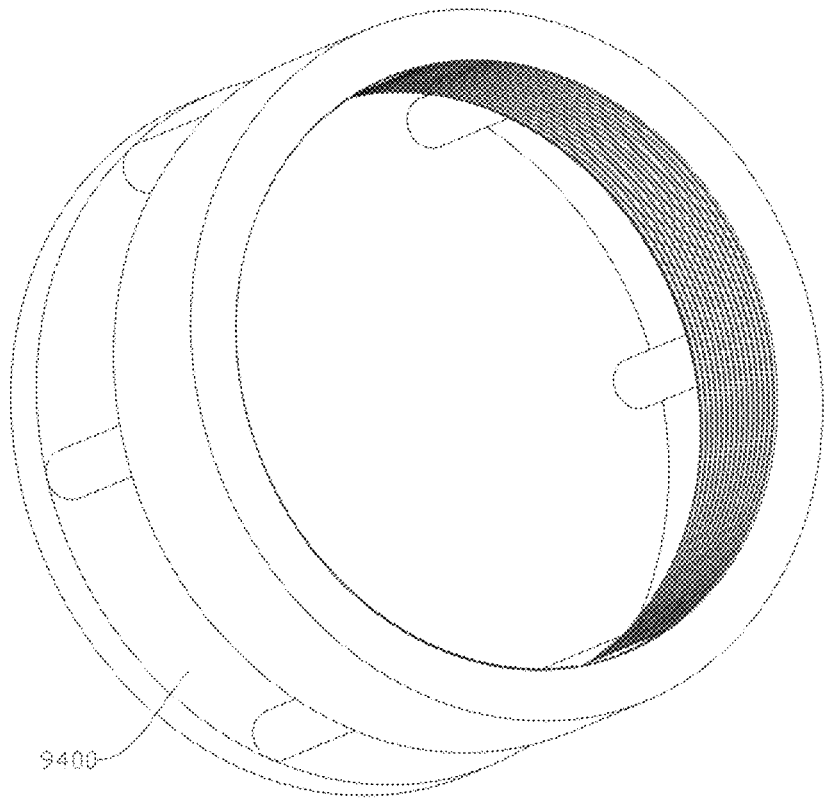
FIG. 14 is a schematic diagram of a structure of a horizontal plate in FIG. 11.

In actual testing, there is a case where two planes (a top plane and a bottom plane) of the disk specimen 1100 are not parallel, for which, it is necessary to adjust a levelness of the disk specimen 1100 facing a plane of the pin specimen 1200, i.e., to adjust a top plane of the disk specimen 1100 in FIG. 2 to be completely horizontal. Therefore, some modifications may be made to the rotating shaft 7110 to adjust an inclination angle of the support platform 7100. In some embodiments, as shown in FIGS. 8 to 10, the rotating shaft 7110 includes a first shaft section 7111, a second shaft section 7112, a cross-shaped hinge shaft 7113, and a plurality of push rods 7114, the cross-shaped hinge shaft 7113 is fixedly connected by a first hinge shaft 71131 and a second hinge shaft 71132 which are perpendicular to each other, the first shaft section 7111 is hinged to the first hinge shaft 71131, and the second shaft section 7112 is hinged to the second hinge shaft 71132, so that the first shaft section 7111 and the second shaft section 7112 can rotate in multiple directions, an annular boss 71121 is arranged on a peripheral sidewall of the second shaft section 7112, a plurality of push rods 7114 are circumferentially arranged along the annular boss 71121, each push rod 7114 passes through the annular boss 71121 and is threadedly connected to the annular boss 71121, and center lines of all the push rods 7114 are parallel to a center line of the second shaft section 7112. Therefore, an included angle between a center line of the support platform 7100 and a center line of the second shaft section 7112, that is, the inclination angle of the support platform 7100 can be adjusted by the push rod 7114, so as to adjust a levelness of the disk specimen 1100 facing an end face of the rotating shaft 7110.

Figure 15:
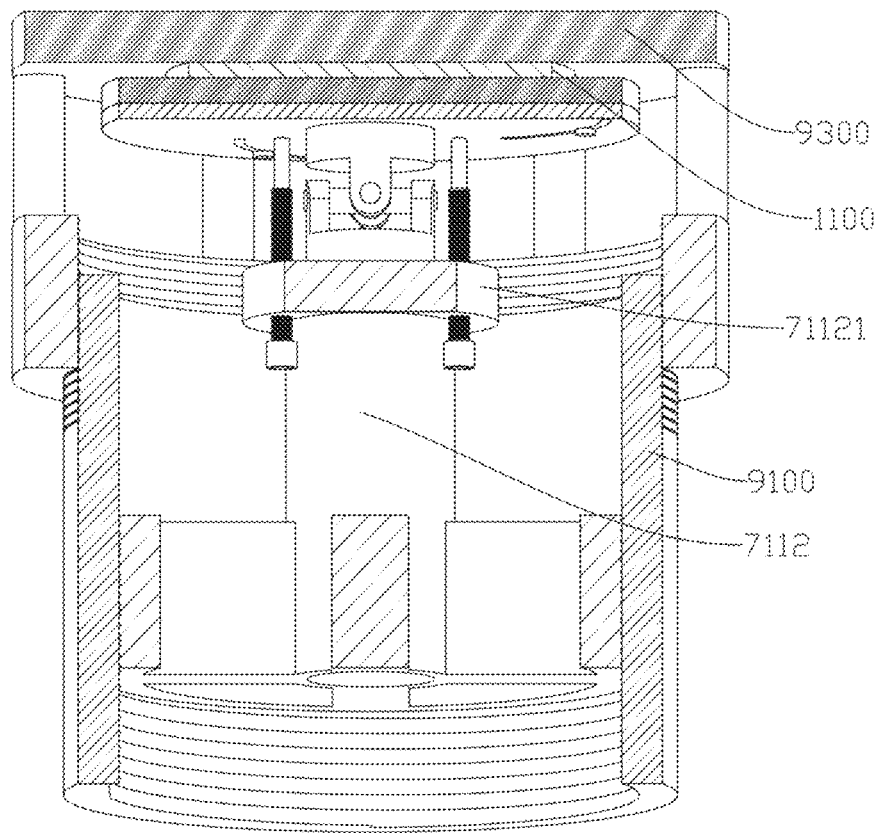
FIG. 15 is an assembly diagram of the levelness calibration mechanism in FIG. 11 and the centering mechanism in FIG. 8.

In addition, a level bubble is used to calibrate the levelness, requiring repeated adjustment of each push rod 7114, which is time-consuming. Therefore, the present invention also provides a new levelness calibration mechanism 9000 that can quickly calibrate the levelness of the disk specimen 1100. As shown in FIGS. 11 to 14, the levelness calibration mechanism 9000 includes a cylinder body 9100, an annular cylinder 9200, a support frame 9300, and a horizontal plate 9400, the annular cylinder 9200 is carried in the cylinder body 9100 by the support frame 9300, the annular cylinder 9200 and the cylinder body 9100 are coaxially arranged, and the second shaft section 7112 can be inserted into the annular cylinder 9200 and is in clearance fit with the annular cylinder. The horizontal plate 9400 is fixedly attached to the cylinder body 9100 in a detachable manner, such as in a threaded connection, such that the horizontal plate 9400 can move along a center line of the annular cylinder 9200, and the center line of the annular cylinder 9200 is perpendicular to the horizontal plate 9400 and faces an end face of the annular cylinder 9200. During the use, as shown in FIG. 15, the second shaft section 7112 is inserted into the annular cylinder 9200, so that the annular cylinder 9200 abuts against the annular boss 71121, and then the horizontal plate 9400 is connected to the cylinder body 9100. In this way, an end face of the disk specimen 1100 facing away from the rotating shaft 7110 can be attached to the horizontal plate 9400, so that the end face of the disk specimen 1100 abutting against the horizontal plate 9400 is perpendicular to the center line of the second shaft section 7112, and then the push rod 7114 is rotated to fix the support platform 7100.

In the present invention, an intensity of a current flowing along a horizontal plane of the disk specimen 1100 may be increased by preventing the current from flowing along the rotating shaft 7110, which is beneficial to enhancing a friction force between the disk specimen 1100 and the support platform 7100, so as to avoid relative sliding between the disk specimen and the support platform. In some embodiments, an insulating component (7100, 7200) may be provided to prevent the current from flowing along the support platform 7100. The form and position of the insulating component may be set based on a requirement. For example, the support platform 7100 and the rotating disk 7200 are made of insulating materials, and the insulating part and the rotating disk may serve as the insulating component.

Figure 16:
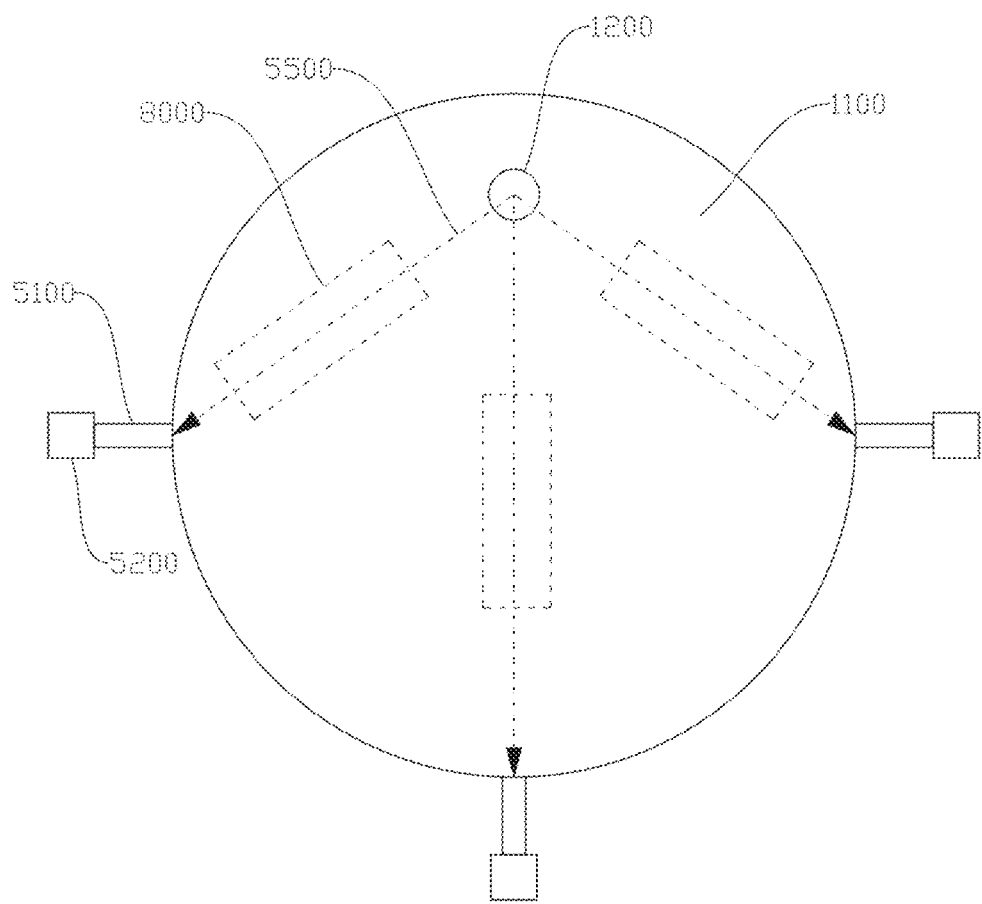
FIG. 16 is a diagram of the arrangement of a disk specimen and a conductive terminal in FIG. 2.
Figure 17:
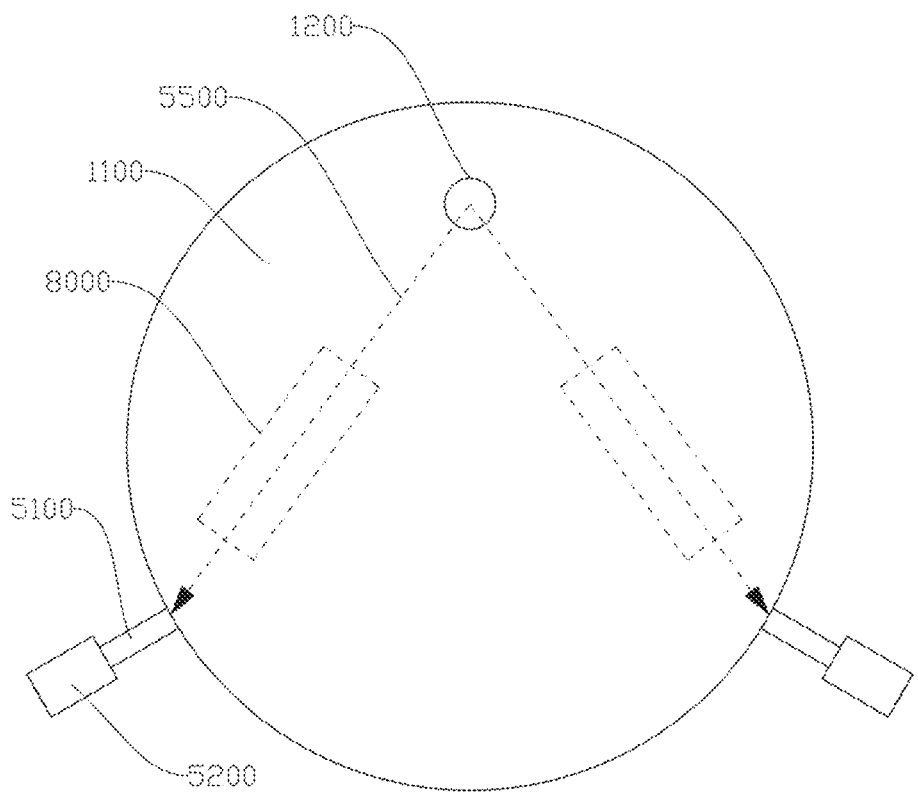
FIG. 17 is a diagram of the arrangement of a disk specimen and a conductive terminal in another embodiment.

In the present invention, the conductive terminal 5100 may be a brush, and a number of the brushes may be selected based on a requirement, such as one, two, or more. When two or more conductive terminals 5100 are used, all the conductive terminals 5100 are arranged in parallel along a circumference of the disk specimen 1100, each conductive terminal 5100 needs to be connected in series with a resistor 5200 to avoid short circuit of the conductive terminals 5100. As shown in FIGS. 16 and 17, to distribute the current uniformly among the conductive terminals 5100, a resistor 5200 with an adjustable resistance value, i.e., a varistor, may be selected, and each varistor is connected in series with an ammeter 5400 to observe a current of each branch. When at least two conductive terminals 5100 are used, one magnetic field generating mechanism 8000 may be arranged, or each conductive terminal 5100 may be respectively matched with one magnetic field generating mechanism 8000.

Figure 18:
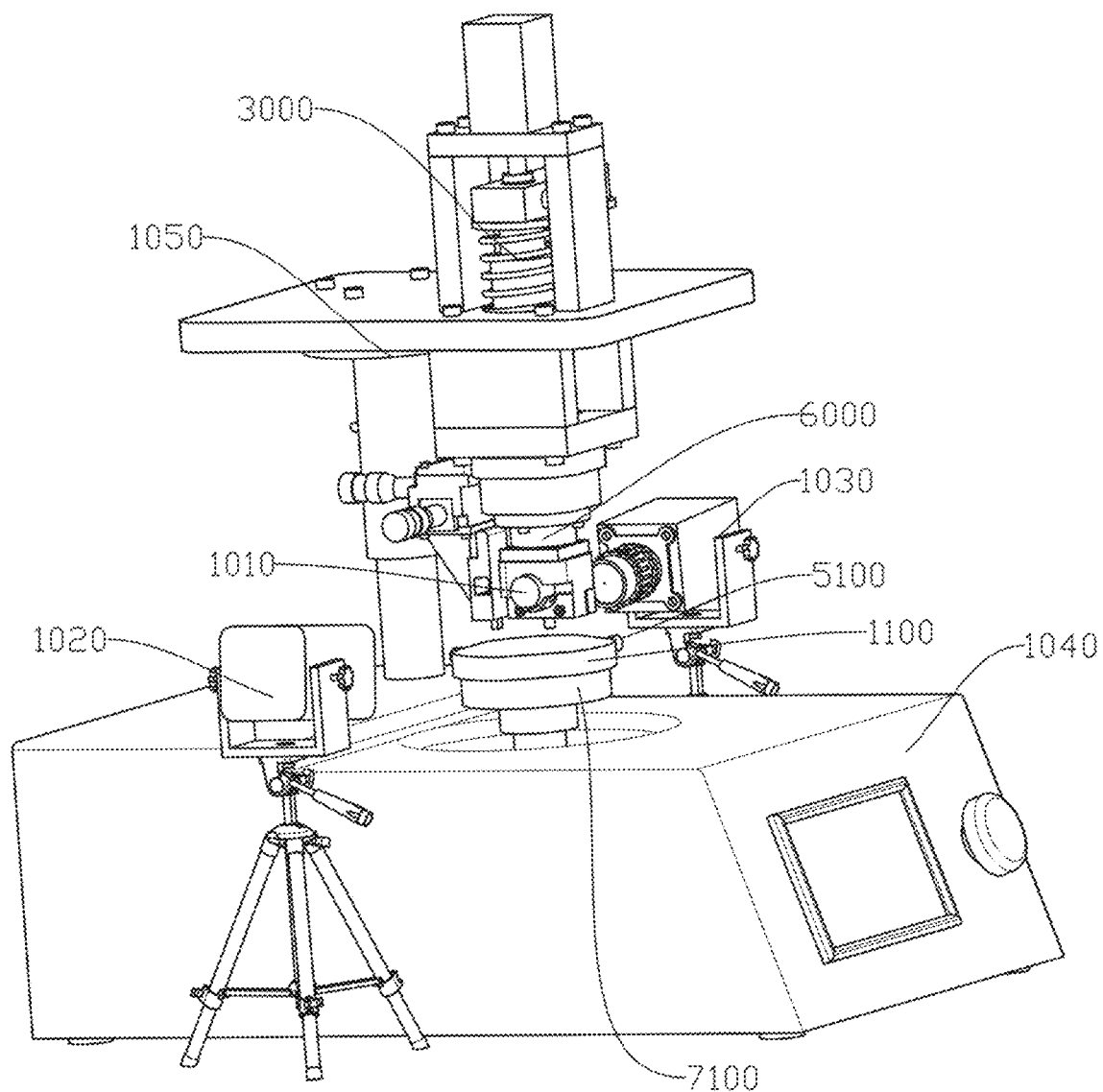
FIG. 18 is a schematic diagram of a three-dimensional structure of another specific embodiment of a pin-on-disk type in-situ current-carrying friction testing system according to the present invention.

In the present invention, other in-situ testing equipment (1010, 1020, 1030) may be additionally arranged based on a requirement. For example, in some embodiments, as shown in FIG. 18, an acoustic emission sensor 1010, a high-speed camera 1020, and a thermal infrared imager 1030 are further provided, the high-speed camera 1020 may be used to capture transient phenomena of electric arcs, the thermal infrared imager 1030 may be used to collect temperature information near a current-carrying friction pair, the acoustic emission sensor 1010 may collect acoustic signals generated when a material surface is damaged, the acoustic emission sensor 1010 may be used to monitor the wear of bearings, engines and tools, and the level of damage to buildings. These scenarios involve the generation of cracks, material breakage, and breaking of atomic bonds, which are similar to friction and wear. Therefore, the integration of the acoustic emission sensor 1010, the high-speed camera 1020, the thermal infrared imager and other in-situ testing equipment may help to more thoroughly study the current-carrying friction failure mechanism.

In some embodiments, to adjust a speed of a relative sliding between the disk specimen 1100 and the pin specimen 1200, an L-shaped cantilever beam 1050 may be provided to carry the pin specimen 1200 and drive the pin specimen 1200 to rotate along a column 1051 positioned outside the disk specimen 1100 and extending in a vertical direction, thereby changing a distance between the pin specimen 1200 and a center of the disk specimen 1100. As shown in FIG. 2, the rotating power mechanism 4000 is carried in the base 1040, the L-shaped cantilever beam 1050 includes a column 1051 and a horizontal beam 1052, one end of the column 1051 is connected to the base 1040, the other end is connected to the horizontal beam 1052, the horizontal beam 1052 can rotate around a central axis of the column 1051, and the pin specimen 1200 is carried on the horizontal beam 1052. When the horizontal beam 1052 rotates around the central axis of the vertical column 1051, a distance between a center line of the pin specimen 1200 and a center line of the rotating shaft 7110 changes accordingly, thereby adjusting a linear velocity of the pin specimen 1200 relative to the disk specimen 1100.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention.

What is claimed is:

1. A pin-on-disk type in-situ current-carrying friction testing system, comprising:
    a pin-on-disk type friction pair, wherein the pin-on-disk type friction pair comprises a disk specimen arranged horizontally, and a pin specimen arranged vertically;
    a clamping mechanism used to clamp the pin specimen;
    an axial force loading mechanism used to push the pin specimen to move vertically;
    a rotating power mechanism used to drive the disk specimen and the pin specimen to rotate relatively;
    a force measuring mechanism used to measure a force between the disk specimen and the pin specimen;
    a support platform used to support the disk specimen;
    a current loading mechanism used to load a current to a contact surface between the disk specimen and the pin specimen, wherein the current loading mechanism comprises a conductive terminal, and the conductive terminal abuts against an annular sidewall of the disk specimen to guide a current in the disk specimen to move along a horizontal direction; and
    a magnetic field generating unit used to generate a magnetic field;
    wherein when the pin specimen and the disk specimen rotate relatively, the pin specimen, the conductive terminal, and the magnetic field are relatively stationary, and the current in the disk specimen flowing along the horizontal direction generates an Ampere force facing the support platform under the action of the magnetic field.

2. The pin-on-disk type in-situ current-carrying friction testing system, according to claim 1, further comprising a centering mechanism used to enable a center line of the disk specimen to be coaxially arranged with a rotating shaft of the support platform.

3. The pin-on-disk type in-situ current-carrying friction testing system according to claim 2, wherein
    the centering mechanism comprises:
    a support platform, wherein the rotating shaft is fixedly connected to the support platform and extends along a center line of the support platform, and a plurality of first guide rails penetrating through the support platform are arranged on the support platform in a circular array around the rotating shaft;
    a rotating disk annularly and coaxially sleeved on an outer wall of the rotating shaft, wherein a plurality of second guide rails penetrating through the rotating disk are arranged on the rotating disk in a circular array around the rotating shaft; and
    a plurality of pin members, wherein each pin member comprises a rod and two heads at two ends of the rod; wherein each pin member corresponds to one first guide rail and one second guide rail, the rod of each pin member passes through the first guide rail and the second guide rail, and the two heads of each pin member are positioned at two sides of the first guide rail and the second guide rail; and when the support platform and the rotating disk rotate relatively, the first guide rail guides the pin member to move along a first direction, the second guide rail guides the pin member to move along a second direction, the first direction and the second direction are positioned in a same plane, and an included angle between the first direction and the second direction is an acute angle or an obtuse angle.

4. The pin-on-disk type in-situ current-carrying friction testing system according to claim 3, wherein the rotating shaft comprises:
    a cross-shaped hinge shaft formed by fixedly connecting a first hinge shaft and a second hinge shaft which are vertical to each other;
    a first shaft section fixedly connected to the support platform and extending along a center line of the support platform, wherein the first shaft section is hinged to the first hinge shaft;
    a second shaft section hinged to the second hinge shaft, wherein an annular boss is arranged on an annular sidewall of the second shaft section; and
    a plurality of push rods arranged along a circumference of the annular boss and used to adjust an inclination angle of the support platform, wherein each of the push rods passes through the annular boss and is threadedly connected to the annular boss, and center lines of all push rods are parallel to a center line of the second shaft section.

5. The pin-on-disk type in-situ current-carrying friction testing system according to claim 4, further comprising a levelness calibration mechanism used to calibrate a levelness of an end face of the disk specimen far away from the rotating shaft, wherein the levelness calibration mechanism comprises:
    a cylinder body;
    an annular cylinder, wherein the annular cylinder is carried in the cylinder body by a support frame, a center line of the annular cylinder is parallel to a center line of the cylinder body, and the second shaft section can be inserted into the annular cylinder and is in clearance fit with the annular cylinder; and
    a horizontal plate fixedly connected to the cylinder body in a detachable manner, wherein a center line of the annular cylinder is perpendicular to an end face of the annular cylinder facing the annular cylinder, and the horizontal plate can move along a center line of the annular cylinder.

6. The pin-on-disk type in-situ current-carrying friction testing system according to claim 1, further comprising an in-situ testing device, wherein the in-situ testing device comprises:
    a high-speed camera used to capture transient phenomena of electric arcs during testing of a pin-on-disk type friction pair;

a thermal infrared imager used to collect temperature information during testing of a pin-on-disk type friction pair; and an acoustic emission sensor used to collect acoustic signals during testing of a pin-on-disk type friction pair.

* * * * *